(12) United States Patent
Takami

(10) Patent No.: US 9,064,020 B2
(45) Date of Patent: Jun. 23, 2015

(54) INFORMATION PROVIDING DEVICE, INFORMATION PROVIDING PROCESSING PROGRAM, RECORDING MEDIUM HAVING INFORMATION PROVIDING PROCESSING PROGRAM RECORDED THEREON, AND INFORMATION PROVIDING METHOD

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 57 days.

(21) Appl. No.: 13/643,712

(22) PCT Filed: Apr. 28, 2011

(86) PCT No.: PCT/JP2011/060394
§ 371 (c)(1),
(2), (4) Date: Oct. 26, 2012

(87) PCT Pub. No.: WO2011/136340
PCT Pub. Date: Nov. 3, 2011

(65) Prior Publication Data
US 2013/0039540 A1    Feb. 14, 2013

(30) Foreign Application Priority Data

Apr. 28, 2010    (JP) .................................. 2010-104277

(51) Int. Cl.
*G06F 17/30*    (2006.01)

(52) U.S. Cl.
CPC ...... *G06F 17/3087* (2013.01); *G06F 17/30265* (2013.01)

(58) Field of Classification Search
CPC .......... G06F 17/3087; G06F 17/30817; G01C 21/20; G01C 21/30; H04M 2250/10; H04M 1/72572; H04M 2250/52; H04N 2201/3253; H04N 1/32128; H04N 21/8253; H04N 2201/0084; G06K 9/00771; G06K 9/2081; G06T 7/60
USPC ......................................................... 382/103
See application file for complete search history.

(56) References Cited

U.S. PATENT DOCUMENTS

| 8,131,118 B1 * | 3/2012 | Jing et al. ...................... 382/305 |
| 2004/0210382 A1 * | 10/2004 | Itabashi ........................ 701/202 |
| 2007/0189612 A1 * | 8/2007 | Takahashi et al. ............ 382/229 |

(Continued)

FOREIGN PATENT DOCUMENTS

| JP | 2002-373168 A | 12/2002 |
| JP | 2005-045398 A | 2/2005 |
| JP | 2007-235238 A | 9/2007 |

OTHER PUBLICATIONS

Japanese Office Action dated Dec. 4, 2012, issued in corresponding Japanese Patent Application No. 2012-512910.

*Primary Examiner* — Amir Alavi
*Assistant Examiner* — Kenny Cese
(74) *Attorney, Agent, or Firm* — Sughrue Mion, PLLC

(57) ABSTRACT

There are provided an information providing device, an information providing processing program, and an information providing method which can efficiently recommend information related to a shooting spot matching a user's preference. An information providing server is configured to decide a coincidence between user object information included in image data registered by a given user, and representative object information of a location whose position can be specified, and notify location information associated with the representative object information, to the user based on a decision result of the coincidence.

17 Claims, 7 Drawing Sheets

(56) References Cited

U.S. PATENT DOCUMENTS

| | | | |
|---|---|---|---|
| 2010/0171763 A1* | 7/2010 | Bhatt et al. | 345/660 |
| 2010/0321489 A1* | 12/2010 | Chen et al. | 348/116 |
| 2011/0053642 A1* | 3/2011 | Lee | 455/556.1 |
| 2013/0124508 A1* | 5/2013 | Paris et al. | 707/723 |

\* cited by examiner

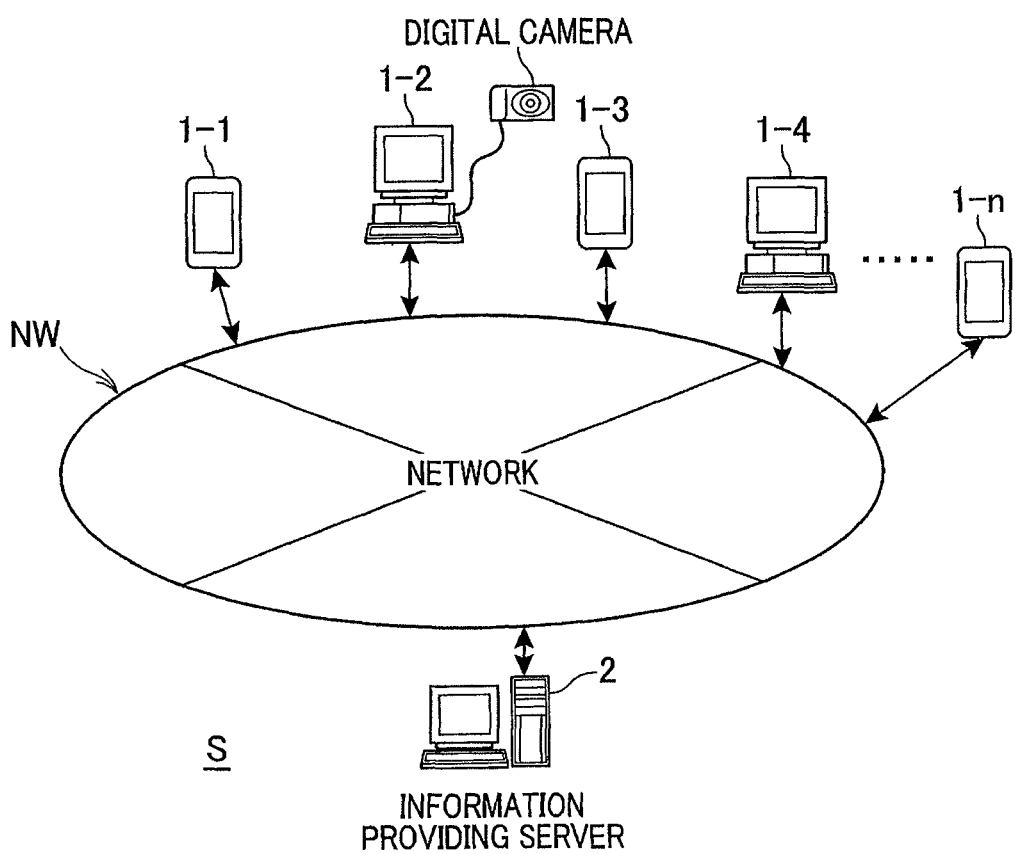

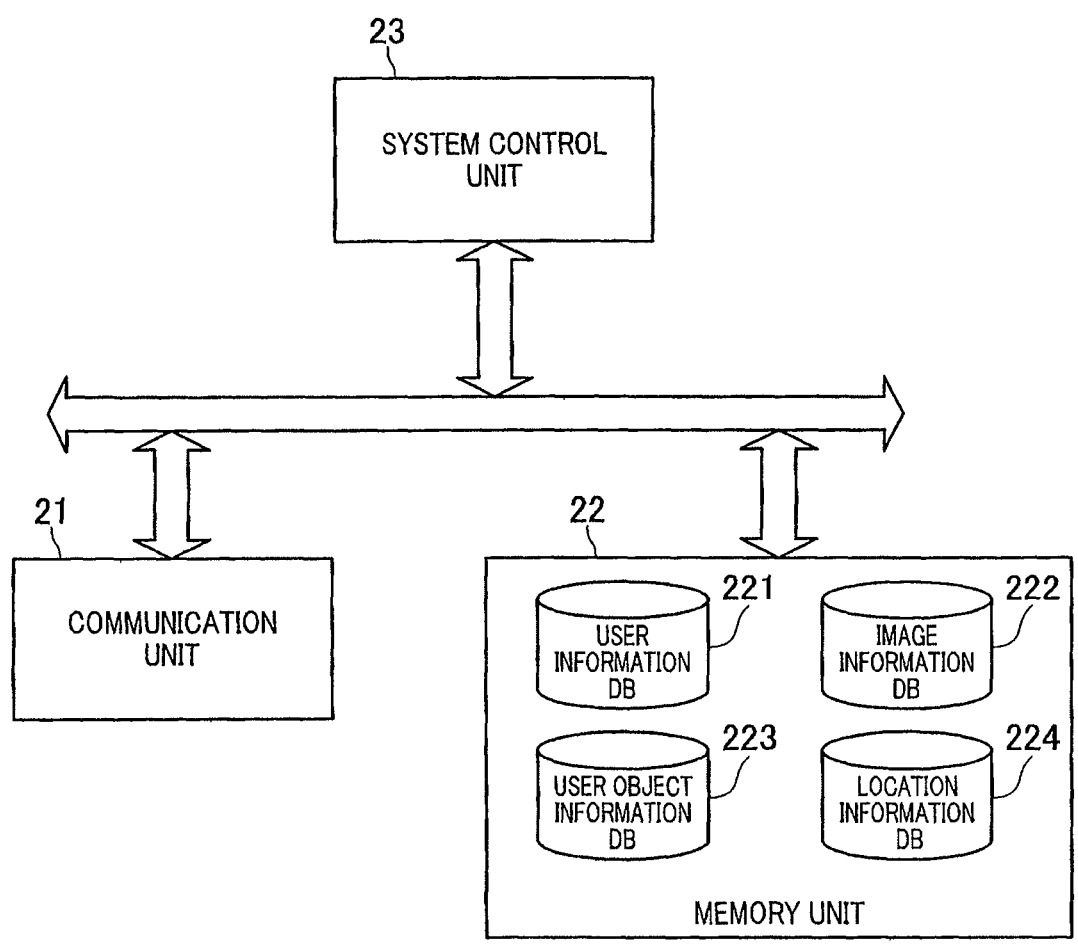

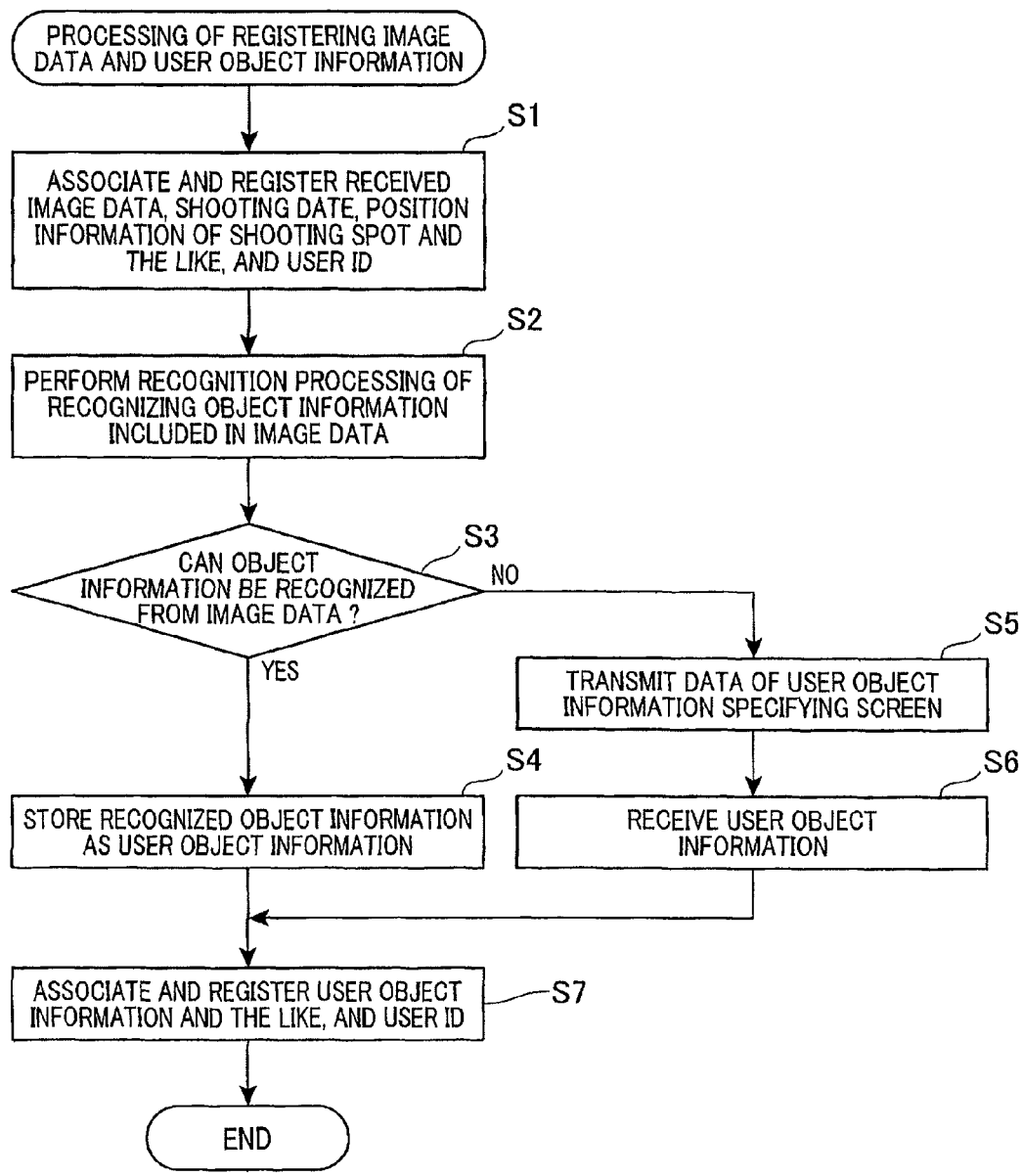

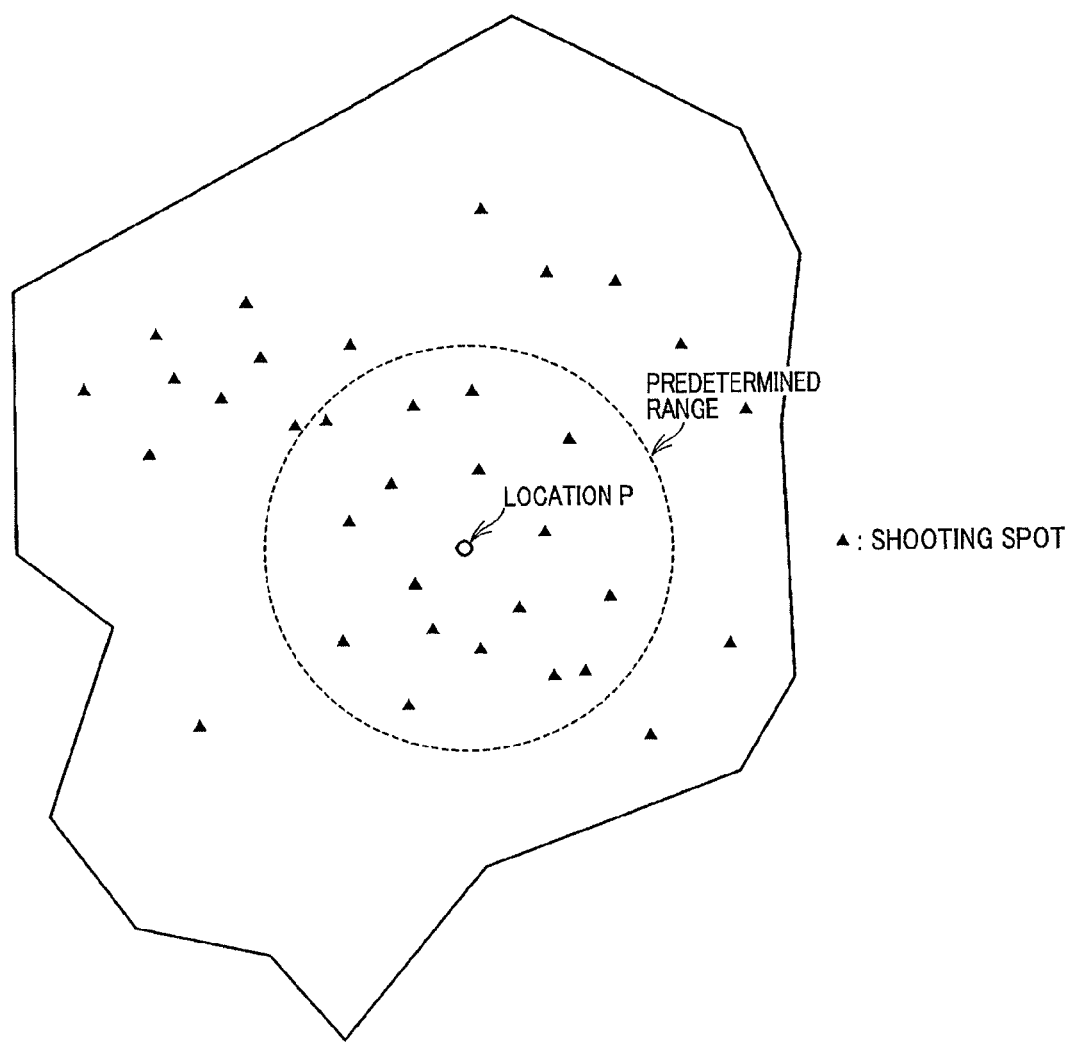

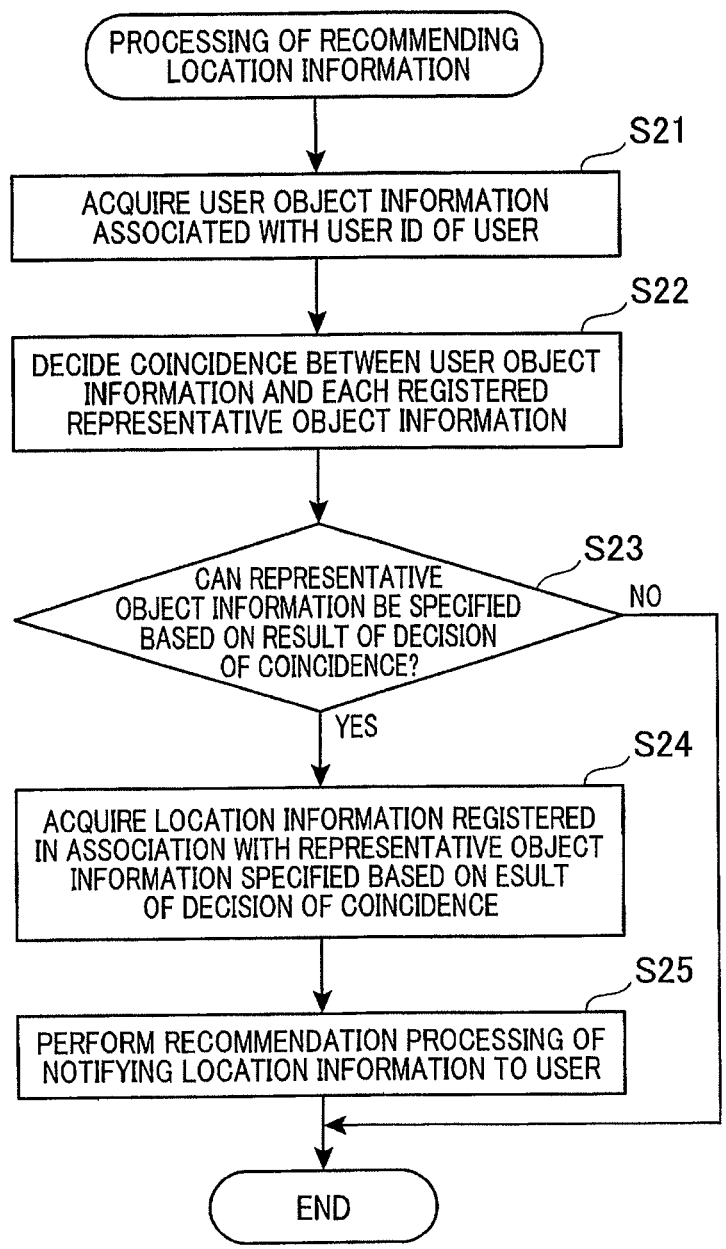

INFORMATION PROVIDING DEVICE, INFORMATION PROVIDING PROCESSING PROGRAM, RECORDING MEDIUM HAVING INFORMATION PROVIDING PROCESSING PROGRAM RECORDED THEREON, AND INFORMATION PROVIDING METHOD

CROSS REFERENCE TO RELATED APPLICATIONS

This application is a National Stage of International Application No. PCT/JP2011/060394, filed on Apr. 28, 2011, and claims priority based on Japanese Patent Application No. 2010-104277, Apr. 28, 2010, the contents of all of which are incorporated herein by reference in their entirety.

TECHNICAL FIELD

The present invention relates to a technical filed such as a system which can recommend information which is useful for shooting spots matching users' preferences, to users, through a network.

BACKGROUND ART

Conventionally, a search service is known which searches for related information using information related to a shooting target (such as a sunrise, high-altitude plants and autumnal leaves) as a key. Such a search service provides information matching a search keyword, to a user terminal which connects to the search service through the Internet, and can search for information to which related information such as a comment is added to a captured image when a shooting spot needs to be searched for.

Patent Literature 1 discloses a technique of generating an original image to which position information is attached by setting longitude/latitude information to an extended tag portion of an Exif format, publishing the generated image on a web page, and providing information related to a shooting spot close to an arbitrary location, in response to information search using arbitrary location information such as a current position of a user as a key.

CITATION LIST

Patent Literature

Patent Literature 1: Japanese Patent Application Laid-Open No. 2002-373168

SUMMARY OF THE INVENTION

Problem to Be Solved by the Invention

However, according to the above conventional technique, a user who searches for a shooting spot needs to set a search keyword which is adequate for the shooting spot, and it is cumbersome for the user to set the keyword. Further, Patent Literature 1 discloses providing information related to a shooting spot close to an arbitrary location which the user sets based on longitude/latitude information included in image information, and it is difficult to efficiently recommend a shooting spot matching a user's preference based on object information (for example, a landscape such as a mountain or a sea, or people such as a family or children) included in a captured image.

The present invention is made in light of the above, and an object of the present invention is to provide an information providing device, an information providing processing program, a recording medium having the information providing processing program recorded thereon, and an information providing method which can efficiently recommend information related to a shooting spot matching a user's preference.

Means for Solving the Problem

In order to solve the above problem, the invention according to claim 1 is an information providing device comprising:

an object information acquiring means that refers to image data and position information in an image data memory means that stores the image data associated with user identification information for identifying a user, and the position information of the image data, and acquires object information included in the image data associated with position information within a predetermined range from each location per location whose position can be specified;

a representative object information determining means that determines, per location, the object information satisfying a predetermined condition as representative object information of the location based on the object information acquired per location;

a user object information acquiring means that acquires user object information to be associated with the user identification information;

a deciding means that decides a coincidence between the acquired user object information and the determined representative object information of the location; and a notifying means that notifies location information related to the location stored in a location information memory means in association with the representative object information, to the user identified from the user identification information based on a decision result of the coincidence by the deciding means.

According to the present invention, it is possible to efficiently recommend information related to a shooting spot from which object information matching a user's preference can be captured among representative object information which can be captured at a shooting spot within a predetermined range from each location.

The invention according to claim 2 is the information providing device according to claim 1, wherein the object information acquiring means acquires the object information included in each image data for a location at which a number of items of image data associated with the position information within the predetermined range from the location among a plurality of locations whose positions can be specified is a predetermined number or more.

According to the present invention, it is possible to select only locations of a plurality of locations at which shooting spots are concentrated to some degree within a predetermined range as recommendation targets of information related to shooting spots and, consequently, recommend only information which is particularly useful for users.

The invention according to claim 3 is the information providing device according to claim 1 or 2, further comprising:

a position information acquiring means that acquires position information indicating a current position of the user; and a location specifying means that specifies the location within the predetermined range from the current position of the user indicated by the acquired position information, from the plurality of locations whose positions can be specified, wherein the object information acquiring means acquires the object information included in the image data associated with the position information within the predetermined range from each location per location specified by the location specifying means.

According to the present invention, it is possible to efficiently recommend information related to a shooting spot from which a user can capture object information matching a user's preference at a position close to a current position.

The invention according to claim 4 is the information providing device according to claim 1 or 2, further comprising:

a position information acquiring means that acquires position information indicating a current position of a user, wherein the deciding means decides a coincidence between representative object information of a location within the predetermined range from the current position of the user indicated by the acquired position information of the representative object information stored in the location information memory means, and the acquired user object information.

According to the present invention, it is possible to efficiently recommend information related to a shooting spot from which object information matching a user's preference can be captured near the current position of the user.

The invention according to claim 5 is the information providing device according to any one of claims 1 to 4, wherein the object information acquiring means acquires the object information other than object information of a specific type from the image data.

The invention according to claim 6 is the information providing device according to any one of claims 1 to 5, wherein the notifying means removes the location information of the location matching the position information of the image data associated with the user identification information of the user, from the location information which is a notification target for the user.

The invention according to claim 7 is the information providing device according to any one of claims 1 to 5, wherein the notifying means removes the location information of the location matching the position information of the image data including the user object information associated with the user identification information of the user, from the location information which is a notification target for the user.

The invention according to claim 8 is the information providing device according to any one of claims 1 to 7, wherein the user object information acquiring means acquires the user object information of the user from the image data stored in association with the user identification information of the user.

According to the present invention, it is possible to automatically acquire the user object information matching the user's preference from the picture which the user took in the past.

The invention according to claim 9 is the information providing device according to any one of claims 1 to 8, wherein the user object information acquiring means acquires object information other than object information of a specific type from the image data as the user object information.

The invention according to claim 10 is an information providing processing program causing a computer to function as:

an object information acquiring means that refers to image data and position information in an image data memory means that stores the image data associated with user identification information for identifying a user, and the position information of the image data, and acquires object information included in the image data associated with position information within a predetermined range from each location per location whose position can be specified;

a representative object information determining means that determines, per location, the object information satisfying a predetermined condition as representative object information of the location based on the object information acquired per location;

a user object information acquiring means that acquires user object information to be associated with the user identification information;

a deciding means that decides a coincidence between the acquired user object information and the determined representative object information of the location; and a notifying means that notifies location information related to the location stored in a location information memory means in association with the representative object information, to the user identified from the user identification information based on a decision result of the coincidence by the deciding means.

The invention according to claim 11 is a recording medium having an information providing processing program recorded thereon which causes a computer to function as:

an object information acquiring means that refers to image data and position information in an image data memory means that stores the image data associated with user identification information for identifying a user, and the position information of the image data, and acquires object information included in the image data associated with position information within a predetermined range from each location per location whose position can be specified;

a representative object information determining means that determines, per location, the object information satisfying a predetermined condition as representative object information of the location based on the object information acquired per location;

a user object information acquiring means that acquires user object information to be associated with the user identification information;

a deciding means that decides a coincidence between the acquired user object information and the determined representative object information of the location; and a notifying means that notifies location information related to the location stored in a location information memory means in association with the representative object information, to the user identified from the user identification information based on a decision result of the coincidence by the deciding means.

The invention according to claim 12 is an information providing method executed by a computer comprising:

a step of referring to image data and position information in an image data memory means that stores the image data associated with user identification information for identifying a user, and the position information of the image data, and acquiring object information included in the image data associated with position information within a predetermined range from each location per location whose position can be specified;

a step of determining, per location, the object information satisfying a predetermined condition as representative object information of the location based on the object information acquired per location;

a step of acquiring user object information to be associated with the user identification information;

a step of deciding a coincidence between the acquired user object information and the determined representative object information of the location; and a step of notifying location information related to the location stored in a location information memory means in association with the representative object information, to the user identified from the user identification information based on a decision result of the coincidence.

Advantageous Effects of the Invention

According to the present invention, it is possible to efficiently recommend information related to a shooting spot from which object information matching a user's preference can be captured among representative object information which can be captured at a shooting spot within a predetermined range from each location.

BRIEF DESCRIPTION OF DRAWINGS

FIG. 1 is a view illustrating an example of a schematic configuration of an information providing system S according to the present embodiment.

FIG. 2 is a block diagram illustrating a schematic configuration example of an information providing server 2.

FIG. 4 is a flowchart illustrating processing of registering image data and user object information in a system control unit 23 of the information providing server 2.

FIG. 6 is a conceptual diagram illustrating positions of shooting spots within a predetermined range from a location.

FIG. 7 is a flowchart illustrating processing of recommending location information in the system control unit 23 of the information providing server 2.

MODE FOR CARRYING OUT THE INVENTION

Figure 3A:
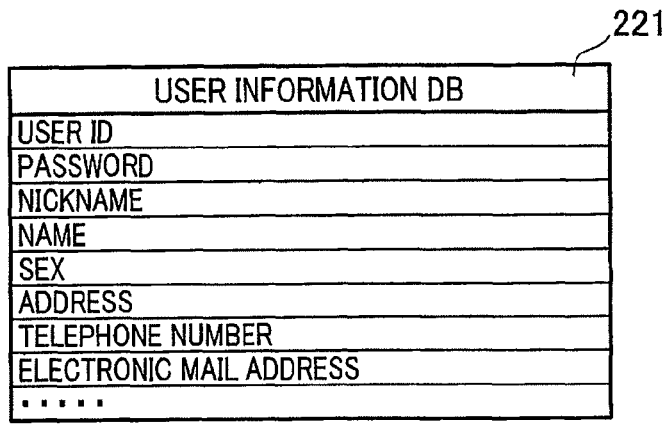
FIG. 3A to FIG. 3D are views illustrating configuration examples of information registered in each database.

An embodiment of the present invention will be described in detail below with reference to the drawings. In addition, the embodiment where the present invention is applied to an information providing system will be described below.

1. Outline of Configuration and Function of Information Providing System

First, an outline of a configuration and a function of an information providing system S according to the present embodiment will be described using FIG. 1. FIG. 1 is a view illustrating an example of a schematic configuration of the information providing system S according to the present embodiment.

As illustrated in FIG. 1, the information providing system S has a plurality of terminals 1-$k$ ($k$=1, 2, 3 ... and n) (an example of a terminal device), and an information providing server 2 (an example of an information providing device). The terminals 1-$k$ and the information providing server 2 can transmit and receive data to and from each other by using, for example, TCP/IP for a communication protocol through a network NW. The terminals 1-$k$ are roughly classified into mobile terminals and desktop terminals. The mobile terminals are, for example, mobile telephones, PDAs and mobile game machines. Meanwhile, the desktop (including notebook) terminals are PCs (Personal Computers). Further, one user may have one terminal 1-$k$ (one of a mobile terminal and a desktop terminal), or one user may have two or more terminals 1-$k$ (for example, both of the mobile terminal and the desktop terminal). In addition, the network NW is formed with, for example, the Internet, a dedicated communication line (for example, CATV (Community Antenna Television) line), a mobile communication network (including, for example, base stations) and a gateway.

Although not illustrated, the terminal 1-$k$ has, for example, a control unit (having a clock function) which has a CPU (Central Processing Unit), an RAM (Random Access Memory) and an ROM (Read Only Memory), a memory unit which has, for example, a flash memory, a communication unit which communicates with, for example, the information providing server 2, an operation unit which is operated by a user and a display unit which displays various screens (for example, webpages) provided from the information providing server 2. Further, when the terminal 1-$k$ is a mobile terminal, the terminal 1-$k$ has a GPS (Global Positioning System) receiver, and a camera (digital camera) for capturing images of subjects. The GPS receiver receives navigation radio waves outputted from GPS satellites through an antenna, and detects a current position (longitude and latitude) of the mobile terminal 1-$k$. In addition, when the terminal 1-$k$ is a mobile terminal, the GPS receiver may not be mounted.

The memory unit of the terminal 1-$k$ stores an OS (Operating System), and application programs such as a browser program. Further, when the terminal 1-$k$ is a mobile terminal, the memory unit of the terminal 1-$k$ stores image data (for example, JPEG files or GIF files) of pictures taken by the camera according to a user operation of the terminal 1-$k$. Meanwhile, when the terminal 1-$k$ is a desktop terminal, the memory unit of the terminal 1-$k$ stores image data captured by a digital camera and transferred to the terminal 1-$k$ by way of, for example, a USB (Universal Serial Bus) cable, near field communication such as infrared ray or Bluetooth (registered trademark) or attachment of image data to an electronic mail. The image data is attached attribute information such as position information (for example, the longitude and the latitude) of a current position (a picture shooting spot) detected by the GPS receiver upon shooting, a shooting date, and a size of image data, and the attribute information is also stored in the memory unit of the terminal 1-$k$ together with the image data.

The control unit of the terminal 1-$k$ accesses image registration sites through the communication unit by activating the application program. In addition, the image registration sites include sites for which image data of pictures taken by users is posted, and sites in which image data of pictures taken by users are stored (stored in, for example, an album format). Further, the control unit of the terminal 1-$k$ transmits (provides) image data and attribute information specified on an image registration screen provided from the image registration site by the user through the operation unit, to the information providing server 2 through the communication unit together with a user ID of the user (an example of user identification information for identifying the user). Meanwhile, the user ID varies per user of the terminal 1-$k$. That is, the user ID of a user of a terminal 1-1 and a user ID of a user of the terminal 1-2 are different. Further, when one user has two or more terminals 1-$k$, the user IDs may be identical or different.

In addition, in case of the terminal 1-$k$ on which the GPS receiver is not mounted, the control unit of the terminal 1-$k$ accesses an image registration site in which image data can be registered from a map. Further, the control unit of the terminal 1-$k$ transmits attribute information including position information of a location (shooting spot) selected by a user on the image registration screen provided from the image registration site, image data specified by the user, and a user ID, to the information providing server 2 through the communication unit. The position information in this case may be the longitude and the latitude of the shooting spot selected by the user, or may be address information indicating an address of the shooting spot selected by the user. Further, the shooting spot may be selected in this case when the user specifies a desired position on a map displayed on the image registration screen or when the user specifies the desired position stepwise from an address list displayed hierarchically on the image registration screen.

Next, the information providing server 2 includes one or a plurality of server computers having functions of, for example, a web server, an application server and a database server.

FIG. 2 is a block diagram illustrating a schematic configuration example of the information providing server 2. As illustrated in FIG. 2, the information providing server 2 roughly has a communication unit 21, a memory unit 22 and a system control unit 23. The memory unit 22 is an example of an image data memory means, a location information memory means and a user object information memory means according to the present invention.

The communication unit 21 connects to the network NW, and controls a communication state with, for example, the terminal 1-*k*.

The memory unit 22 has, for example, a hard disk drive, and stores an OS, server programs (for example, an information providing processing program according to the present invention) and various items of data. In addition, the information providing processing program according to the present invention may be acquired (downloaded) from, for example, a predetermined server through the network NW, or recorded in a recording medium such as a CD (Compact Disc) or a DVD (Digital Versatile Disc) and read.

Further, in the memory unit 22, a user information database (DB) 221, an image information database (DB) 222, a user object information database (DB) 223 and a location information database (DB) 224 are constructed. In addition, the memory unit 22 may be provided inside the information providing server 2, or may be provided outside the information providing server 2 (that is, in another server different from the information providing server 2).

FIG. 3 is a view illustrating a configuration example of information registered in each database.

In the user information database 221 illustrated in FIG. 3A, user information such as a user ID of a user registered as a member, a password, a nickname, a name, a sex, an address, a telephone and an electronic mail address is associated per user and registered (stored). In addition, a member is registered through a member registration procedure screen provided when, for example, the terminal 1-*k* accesses the image registration site, and then a user ID is issued.

Figure 3B:
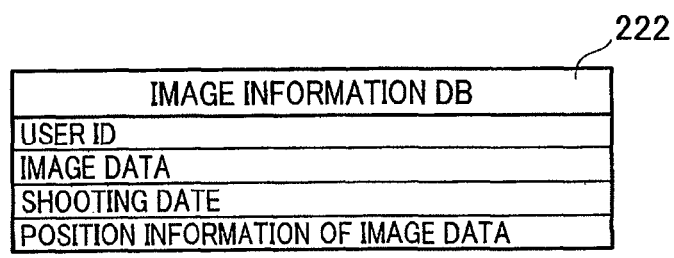

In the image information database 222 illustrated in FIG. 3B, image data (including a file name), a shooting date of a picture related to the image data, position information of the image data (position information of the shooting spot of the picture related to the image data), and a user ID of the user who registered the image data are associated per use, and registered. In addition, the number of items of image data to be registered varies per user. For example, when the number of items of image data registered by a user U1 is 10, the number of items of image data registered by a user U2 is 5. Further, when position information received from the terminal 1-*k* is an address information, the position information is converted into the longitude and the latitude and is registered in the image information database 222.

Figure 3C:
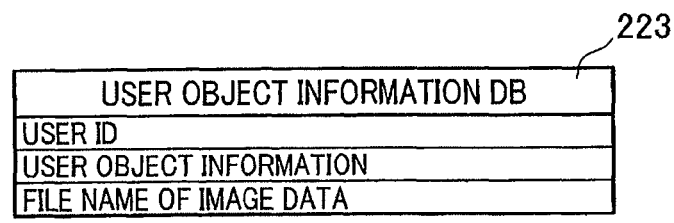

In the user object information database 223 illustrated in FIG. 3C, user object information, a file name of image data of an acquisition source of the user object information and a user ID are associated per user, and registered. In addition, the position information of the image data of the acquisition source of the user object information can be specified from the image information database 222 using a user ID as a key.

In the user object information database 223 illustrated in FIG. 3C, user object information, a file name of image data of an acquisition source of the user object information, and a user ID are associated per user, and registered.

Meanwhile, the user object information is, for example, object information matching a user's preference. The object information includes, for example, people, animals (deer, monkeys, bears, birds and so on), plants (flowers, high-altitude plants and so on), landscapes (buildings, bridges, mountains, lakes, rivers, the sea, hot springs, big trees, forests, waterfalls, autumnal leaves, a sunrise, a sunset and so on), insects, and constructions (Buddha, temples, towers, domes, churches, castles and so on). Such object information is represented by a picture related to image data registered in the image information database 222. By, for example, extracting a feature amount such as gradient information and edge information from image data and comparing a plurality of items of correct data prepared in advance (the feature amount of object information which serves as a criterion), it is possible to recognize object information. According to such an object recognition algorithm, it is possible to identify the number of pieces, the size and the color of object information represented by a picture of image data. By this means, it is possible to acquire object information such as "a plurality of people", "two mountains", "a lake", "a sunset and high-altitude plants" and "a deer and a forest", from image data. Further, a configuration may be employed where object information of a specific type among object information of a plurality of types (for example, people, animals, plants, landscapes, constructions and so on) can be selectively removed from user object information. Meanwhile, the object information of a specific type includes people. In addition, a configuration may be employed where, when unknown object information which cannot be identified upon comparison with all items of correction data (known data) prepared in advance is extracted, this new object information is registered as correct data. In this case, object information which is newly registered as correct data is set by being arbitrarily set by an administrator, or by extracting a feature word from text information (for example, a title or a tag assigned to an image) corresponding to unknown object information.

In addition, the object recognition algorithm can adopt a technique such as known SIFT (Scale Invariant Feature Transform) can be used, and therefore will not be described in more detail. Further, although object information cannot be recognized depending on image data in some cases (there is no corresponding correct data or an image is complicated), a configuration may be employed in this case where a user inputs or selects desired object information from the terminal 1-*k*, and registers the object information in the user object information database 223 as user object information.

Figure 3D:
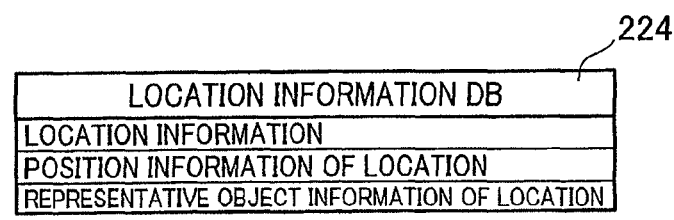

In the location information database 224 illustrated in FIG. 3D, location information related to a location a position of which can be specified, position information of the location (the longitude and the latitude) and representative object information of the location are associated per location, and registered.

Meanwhile, the location the position of which can be specified includes, for example, an arbitrary location (tourist location) on a map, and a shooting spot of a picture related to image data registered in the image information database 222. The location is, for example, Nikko, Kamakura, Nara, Katsuyama, Ushiku, Kyoto, Rome, Pisa or Niagara. The location information includes information such as a name of a location, an address and directions to the location. Further, the representative object information of a location is object information which satisfies predetermined conditions among object information included in image data (image data registered in the image information database 222) associated with position information of each shooting spot within a predetermined range from the location. When, for example, there are a plurality of pieces of object information shown on a predetermined number of (for example, 300) images or more and a plurality of pieces of object information shown on a predetermined of (for example, 300) images, object information of these pieces of object information including the greatest number of images is object information which satisfies predetermined conditions. Alternatively, object information which is unique to a location an image of which can be captured within a predetermined range of the location is object information which satisfies the predetermined conditions. When, for example, there is unique object information (for example, a protected species) which is registered in advance among object information included in image data associated with position information of each shooting spot within the predetermined range from the location, this object information is object information which satisfies the predetermined condition.

The system control unit 23 has, for example, a CPU of a computer, an ROM and an RAM. Further, when the CPU reads and executes a server program stored in the ROM or the memory unit 22, the system control unit 23 functions as an object information acquiring means, a representative object information determining means, a user object information acquiring means, a deciding means, a notifying means, a location specifying means, a position information acquiring means, a ranking means and an object appearance counting means according to the present invention, and performs processing which is described below.

2. Operation of Information Providing System

Next, an operation of the information providing system S according to the present embodiment will be described.

(Processing of Registering Image Data and User Object Information)

First, processing of registering image data and user object information in the information providing server 2 will be described using FIG. 4.

FIG. 4 is a flowchart illustrating processing of registering image data and user object information in the system control unit 23 of the information providing server 2.

After the terminal 1-k activates the application program, when the terminal 1-k accesses the image registration site in response to a user's operation of the operation unit, and the user is authenticated (logs in) in log-in processing, the image registration screen is provided from the image registration site to the terminal 1-k and displayed on the display unit. The control unit of the terminal 1-k reads image data specified by the user on the image registration screen through the operation unit (image data which the user needs to register), and attribute information of the image data, from the memory unit, and transmits the image data and the attribute information to the information providing server 2 through the communication unit. In addition, as described above, position information included in attribute information is specified by a user in some cases based on map data provided from an image registration site.

Further, a configuration may be employed where, after the terminal 1-k activates the application program, when the terminal 1-k accesses an image registration site in response to a user s operation of the operation unit, an image registration screen is provided from the image registration site to the terminal 1-k without user s log-in. In this case, the control unit of the terminal 1-k transmits image data specified by the user on the image registration screen through the operation unit and attribute information of the image data, and a user ID inputted by the user, to the information providing server 2.

In addition, when the terminal 1-k is a mobile terminal, image data registered in processing illustrated in FIG. 4 is image data captured by the digital camera of the terminal 1-k. Meanwhile, when the terminal 1-k is a desktop terminal, image data registered in processing illustrated in FIG. 4 is image data captured by, for example, a digital camera, and transferred to the terminal 1-k by way of a USB cable, near field communication of infrared ray or Bluetooth, or attachment to an electronic mail. Further, although image data to be registered is desirably captured by a user using a camera, image data may be captured by a friend or some other person other than the user.

Thus, when the information providing server 2 receives, for example, image data and attribute information transmitted from the terminal 1-k, the processing illustrated in FIG. 4 is started.

In FIG. 4, the system control unit 23 of the information providing server 2 associates and registers, for example, the image data received from the terminal 1-k and position information (position information of the image data) of a shooting date and a shooting spot included in attribute information, and a user ID of a user of the terminal 1-k in the image information database 222 (step S1).

Next, the system control unit 23 executes recognition processing of recognizing object information included in image data registered in step S1, according to the above object recognition algorithm (step S2), and decides whether or not object information can be recognized from image data (step S3).

Further, when recognizing the object information from the image data (step S3: YES), the system control unit 23 temporarily stores the recognized object information as user object information in the RAM 23c (step S4), and proceeds to step S7. By this means, it is possible to automatically acquire user object information matching a user's preference, from image data of a picture taken by the user in the past. In addition, the system control unit 23 may be configured to acquire (temporarily store in the RAM 23c) as user object information other than the object information (for example, people) of a specific type from object information recognized from image data. By this means, even when, for example, people are recognized from image data, it is possible to remove these people, and recommend information related to a shooting spot of object information other than these people, to the user according to processing which will be described below.

Meanwhile, when object information cannot be recognized from image data (step S3: NO), the system control unit 23 transmits data of a user object information specifying screen to input or select user object information (step S5). The user object information inputted by the user or selected by the user from a user object information candidate list through the operation unit on the user object information specifying screen displayed on the display unit of the terminal 1-*k* in this way is transmitted from the terminal 1-*k* to the information providing server 2.

Further, when receiving the user object information transmitted from the terminal 1-*k* (step S6), the system control unit 23 of the information providing server 2 temporarily stores this user object information in the RAM 23*c* and proceeds to step S7.

In step S7, the system control unit 23 associates and registers the user object information temporarily stored in the RAM 23*c* and a file name of image data of an acquisition source of the user object information, and a user ID of the user of the terminal 1-*k* in the user object information database 223.

Thus, registration of registered image data and position information of a shooting spot, and user object information is finished. This processing is performed every time the terminal 1-*k* transmits image data, and a plurality of pieces of user object information are registered in the user object information database 223. In addition, a configuration may be employed where processing of registering object information is executed on a regular basis (for example, once a day) at predetermined time intervals or every time a predetermined number of images are accumulated (for example, once every time 10 images are accumulated).

In addition, a configuration may be employed where, when a predetermined number of (for example, 10) items of image data are registered as described above, the system control unit 23 counts an appearance count of user object information included in each image data registered in association with a user ID of a given user (for example, an appearance count of "mountain" is five, and an appearance count of "lake" is three), performs ranking and associates and registers again user object information and file names of image data of higher appearance counts up to predetermined ranks (for example, the first to the third), and the user ID of the user in the user object information database 223. In this case, each user object information registered in the user object information database 223 is stored in association with information indicating the appearance count.

Alternatively, a configuration may be employed where, when a predetermined number of items of (for example, 10) image data are registered, the system control unit 23 counts an appearance count of user object information included in each image data registered in association with a user ID of a given user, and associates and registers again user object information of a predetermined appearance count or more and file names of image data, and the user ID of the user in the user object information database 223. Also in this case, information indicating an appearance count is stored in association with each user object information registered in the user object information database 223.

In addition, although FIG. 4 illustrates an example where the information providing server 2 is configured to associate and register image data received from the terminal 1-*k* and a user ID in the image information database 222, a configuration may be employed with another example where image data is acquired from a web server connected to the Internet by a so-called crawler function (a function of collecting information by tracking a link of a webpage published on the Internet) of the information providing server 2, and is registered in the image information database 222. In this case, image data added at least position information of the acquired image data is extracted and registered in the image information database 222.

(Processing of Registering Representative Object Information of Location)

Next, processing of registering representative object information of a location in the information providing server 2 will be described using FIG. 5.

Figure 5:
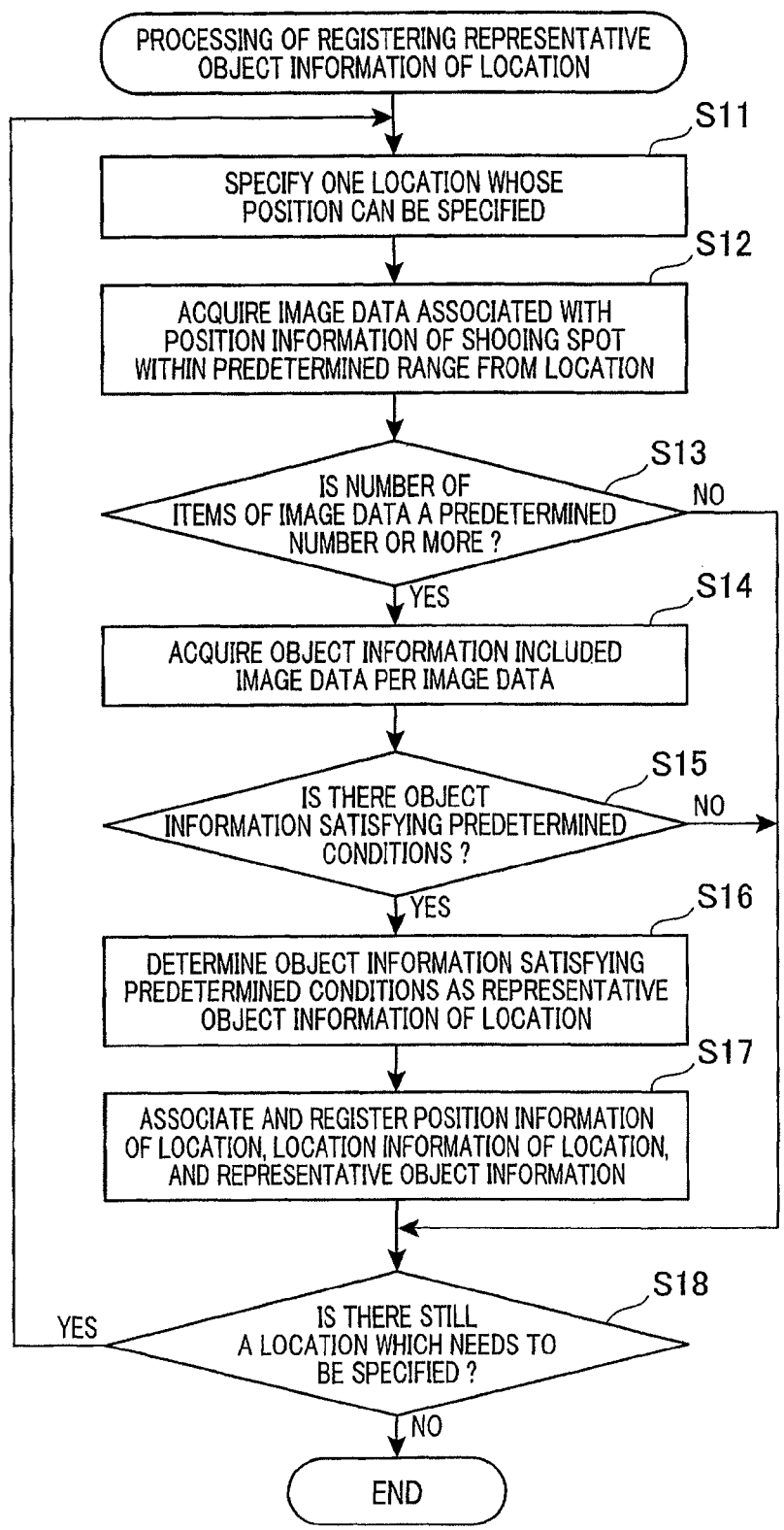
FIG. 5 is a flowchart illustrating processing of registering representative object information of a location in the system control unit 23 of the information providing server 2.

FIG. 5 is a flowchart illustrating processing of registering representative object information of a location in the system control unit 23 of the information providing server 2. In addition, processing illustrated in FIG. 5 is executed, for example, on a regular basis (for example, once a day) at a predetermined time interval. Alternatively, the processing illustrated in FIG. 5 is started in the terminal 1-*k* when the terminal 1-*k* accesses, for example, a shooting spot providing spot in response to a user's operation of the operation unit, and the user is authenticated in log-in processing.

In FIG. 5, the system control unit 23 of the information providing server 2 specifies one location a position of which can be specified (specifies position information) (step S11). This position information of the location is specified, for example, in a registration order or at random from position information of a shooting spot registered in the image information database 222. Alternatively, the position information may be specified from a database which registers position information of a location such as a tour location in advance.

In addition, a configuration may be employed where, when the processing illustrated in FIG. 5 is started when a user is authenticated upon an access to the shooting spot providing site, the system control unit 23 of the information providing server 2 acquires position information indicating a current position of the authenticated user (position information detected by the GPS receiver of the terminal 1-*k*) from the terminal 1-*k* upon execution of processing in step S11. In this case, in step S11, the system control unit 23 specifies one location within a predetermined distance of the radius from a current position of a user indicated by the acquired position information (for example, a range within a predetermined distance of a radius (for example, 1 km to 3 km) about the current position of the user (for example, a trip destination)), from a plurality of locations (for example, locations spotted all across the country) positions of which can be specified. By this means, it is possible to efficiently recommend information related to a shooting spot at which object information matching a user's preference can be captured, near the current position of the user (for example, a trip destination).

Next, the system control unit 23 acquires image data associated with position information of a shooting spot within a predetermined range from the specified location, from the image information database 222 based on position information of the specified location and position information of each shooting spot registered in the image information database 222 (step S12).

Meanwhile, "a predetermined range from a location" refers to a range which defines an area as the vicinity of the location (in other words, a range around the location from which the user can immediately go to the shooting spot). For example, the range within a predetermined distance of the radius (for example, 100 to 300 m) about the position of the location, or the range in an area (for example, an area of, for example, the same block number) of an administrative section including the position of the location is determined by the system control unit 23 as "the predetermined range from the location". The range determined in this way is specified based on, for example, the longitude and the latitude, so that it is possible to specify a shooting spot in the range by comparing the longitude and the latitude for specifying the range, and the longitude and the latitude of each shooting spot registered in the image information database 222.

FIG. 6 is a conceptual diagram illustrating a position of a shooting spot within a predetermined range from a location. With an example illustrated in FIG. 6, image data associated with each shooting spot (triangle symbol) within a predetermined range from a location P is acquired from the image information database 222.

Next, the system control unit 23 decides whether or not the number of items of image acquired in step S12 is a predetermined number or more (step S13). Further, when deciding that the number of items of image data is a predetermined number (for example, 1000) or more (step S13: YES), the system control unit 23 proceeds to step S14, and, when deciding that the number of items of image data is not a predetermined number or more (step S13: No), proceeds to step S18. In addition, the system control unit 23 may be configured to proceed from step S12 to step S14 without performing processing in step S13.

In step S14, the system control unit 23 acquires object information included in image data acquired in step S12 per image data. That is, the image data and the position information acquired from the image information database 222 are referred to, and, for a location at which the number of items of image data associated with position information of a shooting spot within a predetermined range from the location among a plurality of locations positions of which can be specified is a predetermined number or more, object information related to each image data is acquired. This is for using only locations at which shooting spots are concentrated to some degree (that is, which have popularity) as recommendation targets.

In this step S14, when user object information is associated with a file name of the image data and is already registered in the user object information database 223, the user object information is acquired (appropriated). Meanwhile, when the user object information is not registered, the system control unit 3 acquires object information recognized by performing the same processing as in step S2. Even in this case, the system control unit 23 may be configured to acquire object information other than object information of a specific type (for example, people) from image data. By this means, even when, for example, people are recognized from image data, it is possible to remove these people. According to processing which will be described below, it is possible to recommend information related to a shooting spot of object information other than people, to the user. In addition, a configuration may be employed in step S15 where object information of a specific type is object information which does not satisfy the predetermined conditions.

Next, the system control unit 23 decides whether or not there is object information which satisfies predetermined conditions among a plurality of pieces of object information acquired in step S12 (step S15). Further, when deciding that there is object information which satisfies predetermined conditions (step S15: YES), the system control unit 23 proceeds to step S16, and when deciding that there is no object information which satisfies the predetermined conditions (step S15: NO), proceeds to step S18.

Meanwhile, the object information which satisfies the predetermined conditions corresponds to, for example, object information included in a predetermined number of items of (for example, 300) image data. In this case, whether or not the number of items of image data including object information is counted per object information (for example, "a plurality of people", "two mountains", "a lake", "a sunset and high-altitude plants", "a deer and a forest" and so on), and whether or not there is the predetermined number of items of image data are decided. In addition, when there is a plurality of pieces of object information included in a predetermined number of items of image data or more, object information which is included in the greatest number of items of the image data is determined as representative object information.

Alternatively, object information matching one of pieces of object information among a plurality of pieces of object information (for example, unique object information) set in advance by an administrator may be object information which satisfies the predetermined conditions.

In step S16, the system control unit 23 determines the object information which satisfies the predetermined conditions, as representative object information of the location (that is, a location at which the number of items of data is a predetermined number or more).

Next, the system control unit 23 associates and registers position information of the location specified in step S11, location information of the location and the representative object information determined in step S16 in the location information database 224 (step S17). Meanwhile, location information of a location is acquired from, for example, a predetermined database using, for example, position information of the location as a key.

In step S18, the system control unit 23 decides whether or not there is still a location which needs to be specified. When, for example, the number of locations specified in step S11 among a plurality of locations which are extracted in advance and positions of which can be specified is less than a predetermined number, it is decided there is still a location which needs to be specified. Further, when deciding that there is still a location which needs to be specified (step S18: YES), the system control unit 23 returns to step S11, and specifies one location the position of which can be specified. In addition, in step S11 back from step S18, a location within a predetermined range decided in step S12 is removed from locations to be specified.

As described above, object information which satisfies the predetermined conditions is determined per location as representative object information of the location and registered based on object information acquired per location. In addition, representative object information of a plurality of different locations is the same in some cases. For example, representative object information of locations such as "Nara", "Kamakura", "Ushiku" and "Katsuyama" are each assumed to be "Buddha".

Meanwhile, when deciding there is no location which needs to be specified (step S18: NO), the system control unit 23 finishes the processing illustrated in FIG. 5. In addition, when the processing illustrated in FIG. 5 is started when the user accesses a shooting spot providing site and is authenticated, the processing proceeds to processing illustrated in FIG. 7.

In addition, image data registered in the image information database 222 (for example, there are image data which is newly registered and image data which becomes obsolete and is deleted) as time passes, and therefore the processing illustrated in FIG. 5 is performed on a regular basis and representative object information of each location registered in the location information database 224 is updated.

(Processing of Recommending Location Information)

Next, processing of recommending location information in the information providing server 2 will be described using FIG. 7.

FIG. 7 is a flowchart illustrating processing of recommending location information in the system control unit 23 of the information providing server 2. In addition, the processing illustrated in FIG. 7 proceeds from step S18 illustrated in FIG. 5. When the processing illustrated in FIG. 7 does not proceed from step S18 illustrated in FIG. 5, the processing illustrated in FIG. 7 is started when the terminal 1-*k* accesses, for example, the shooting spot providing site and the user is authenticated in log-in processing. Further, a configuration may be employed where the processing illustrated in FIG. 7 is started immediately after processing of registering image data and user object information illustrated in FIG. 4 is executed.

In FIG. 7, the system control unit 23 of the information providing server 2 acquires user object information registered in association with a user ID of a user authenticated in the log-in processing, from the user object information database 223 (step S21). In addition, when a plurality of pieces of user object information are registered in association with the user ID, for example, user object information of a higher appearance count up to a predetermined rank is acquired from a plurality of pieces of user object information, or user object information of a predetermined appearance count or more is acquired. Alternatively, a configuration may be employed where one or a plurality of (may be all) pieces of user object information selected at random from a plurality of pieces of user object information is acquired.

Next, the system control unit 23 decides the coincidence between user object information and each representative object information by comparing the acquired user object information and each representative object information registered in the location information database 224, and specifies representative object information based on the decision result of the coincidence (step S22). For example, representative object information which perfectly matches user object information is specified. Alternatively, when a plurality of pieces of user object information are acquired in step S21, representative object information matching at least one of a plurality of pieces of user object information is specified.

Further, when representative object information cannot be specified based on the decision result of the coincidence (step S23: NO), the system control unit 23 finishes the processing illustrated in FIG. 7. Meanwhile, when representative object information can be specified based on the decision result of the coincidence (step S23: YES), the system control unit 23 proceeds to step S24.

In step S24, the system control unit 23 acquires location information registered in association with representative object information specified in step S22, from the location information database 224.

Further, the system control unit 23 executes recommendation processing of notifying the acquired location information to the user identified based on the user ID (step S25). In this recommendation processing, for example, the acquired location information is transmitted to the terminal 1-*k* of the user. The location information transmitted in this way is notified to the user by being displayed on the screen of the display unit of the terminal 1-*k*. Thus, information related to the shooting spot is recommended for the user. Meanwhile, a configuration may be employed where location information of a location matching position information of image data (that is, image data which is registered in association with the user ID of the user and which is an acquisition source of the user object information) including user object information registered in association with the user ID of the user can be selectively removed from location information (that is, location information acquired in step S24) which is a notification target (recommendation target) for the user. When, for example, user object information is "Buddha" and representative object information is specified as "Buddha" in step S22, the locations matching the representative object information are "Nara", "Kamarakura", "Ushiku" and "Katsuyama". Further, when position information of image data (that is, image data registered by the user) of the acquisition source of user object information is the same as position information of "Nara", position information of the location "Nara" is removed. The location information removed in this way is not notified to the user in the recommendation processing. This configuration is directed to taking into account that, for example, "Buddha" included in image data is captured in "Nara" by the user, and enabling selective removal of information related to such a shooting spot from a recommendation target for the user. By this means, it is possible to avoid complication caused when location information which is not necessary for the user is notified to the user. Further, a configuration may be employed with another example where location information of a location matching position information of image data registered in association with the user ID of the user can be selectively removed from location information which is a notification target. When, for example, image data registered by the user includes image data which is assigned the same position information as position information of "Kamakura", even if this image data does not include representative object information "Buddha", location information of the location "Kamakura" is removed. This configuration is directed to taking into account that, even when, for example, object information included in image data is not "Buddha", the object information is captured by the user in "Kamakura" (for example, it is taken into account that, although the user has been to Kamakura, the user was not interested in "Buddha" and did not take a picture of "Buddha"), and enabling selective removal of information related to such a shooting spot from the recommendation target for the user. By this means, it is possible to avoid complication caused when location information which is not necessary for the user is notified to the user.

In addition, a configuration may be employed where, instead of performing recommendation processing in step S25 of removing location information of a location matching position information of image data of an acquisition source of user object information and position information of image data registered by the user among location information acquired in step S24, the location information is removed from an acquisition target in step S24. Further, a configuration may also be employed where this location information is described in an electronic mail and this electronic mail is transmitted to an electronic mail address of the user in the recommendation processing. In this case, the user may not be authenticated in log-in processing, and, for example, the location information is notified to the user associated with a user ID specified from the user object information database 223 by means of an electronic mail on a regular basis.

As described above, according to the above embodiment, the information providing server 2 is configured to decide the coincidence between user object information included in image data registered by a given user and representative object information of a location a position of which can be specified (for example, object information unique to the location), and notify to the user location information associated with representative object information based on the decision result of the coincidence, so that it is possible to efficiently recommend information related to a shooting spot matching a user's preference.

Further, the information providing server 2 is configured to acquire object information included in each image data and determine representative object information for a location at which the number of items of image data associated with position information of a shooting spot within a predetermined range from the location among a plurality of locations positions of which can be specified is a predetermined number or more, so that it is possible to select only locations at which shooting spots are concentrated to some degree within a predetermined range (that is, which have popularity accordingly) and recommend only information which is particularly useful for the user.

Furthermore, the information providing server 2 is configured to count an appearance count of object information included in each image data when a given user registers a plurality of items of image data, acquire object information which appears a predetermined number of times or more or object information of a higher appearance count up to a predetermined rank as user object information, and decide the coincidence, so that it is possible to efficiently recommend information related to a shooting spot from which object information matching the user's preference the most can be captured.

In addition, the system control unit 23 may be configured to acquire position information indicating the current position of an authenticated user (position information detected by the GPS receiver of the terminal 1-*k*), from the terminal 1-*k* upon decision of the coincidence in step S22. In this case, the system control unit 23 decides the coincidence between representative object information of a location within a predetermined range (for example, a range within a predetermined distance of the radius about the current position of the user) from the current position of the user indicated by position information acquired from the terminal 1-*k* among each representative object information registered in the location information database 224, and user object information. Consequently, it is possible to efficiently recommend information related to a shooting spot from which object information matching a user's preference can be captured near the current position of the user (for example, a trip destination).

Further, a configuration may be employed where, in the recommendation processing in step S25, the location information and the representative object information specified based on the decision result of the coincidence in step S22 are notified to the user. According to this configuration, it is possible to easily learn what object information the user can capture at a shooting spot near the recommended location.

Further, a configuration may be employed where, when a plurality of pieces of representative object information can be specified based on the decision result of the coincidence in processing in step S23, a list of location information registered in association with each representative object information is transmitted to the terminal 1-*k* and displayed in the recommendation processing in step S25. According to this configuration, even when there are multiple locations which are recommendation targets, the user can easily learn a shooting spot near these locations.

Further, with the present embodiment, the system control unit 23 of the information providing server 2 is configured to specify object information included in image data received from the terminal 1-*k* using an object recognition algorithm. Instead of this, a configuration may also be employed where a program including an object recognition algorithm is installed in the mobile terminal 1-*k*, object information included in image data is specified by the mobile terminal 1-*k*, and this object information is received by the information providing server 2.

Further, when a plurality of pieces of representative object information can be specified based on the decision result of the coincidence in the processing in step S23, map information indicating the position of each location registered in association with each representative object information is transmitted to the terminal 1-*k* and displayed in the recommendation processing in step S25. According to this configuration, even when there are multiple locations which are recommendation targets, the user can easily learn from a map a position of a shooting spot near these locations.

EXPLANATION OF REFERENCE SIGNS

1-*k* Terminal
2 Information Providing Server
21 Communication Unit
22 Memory Unit
23 System Control Unit
NW Network
S Information Providing System

The invention claimed is:

1. An information providing device, including at least one processor, comprising:
   an object information acquiring unit, within at least one of said at least one processor, that refers to image data and position information in an image data memory that stores the image data associated with user identification information for identifying a user, and the position information of the image data, and acquires object information included in the image data associated with position information within a predetermined range from each location per location whose position can be specified;
   a representative object information determining unit, within at least one of said at least one processor, that determines, per location, the object information satisfying a predetermined condition as representative object information of the location based on the object information acquired per location;
   a user object information acquiring unit, within at least one of said at least one processor, that acquires, from a picture of the image data stored in association with the user identification information of the user, the object information represented by the picture, as user object information of the user;
   a deciding unit, within at least one of said at least one processor, that decides a coincidence between the acquired user object information and the determined representative object information of the location;
   a concentration check unit, within at least one of said at least one processor, that identifies locations, within the predetermined range, based on a degree of concentration of shooting spots; and
   a notifying unit, within at least one of said at least one processor, notifies location information related to the location stored in a location information memory in association with the representative object information, to the user identified from the user identification information based on a result of the identification by the concentration check unit and a decision result of the coincidence by the deciding unit.

2. The information providing device according to claim 1, wherein the object information acquiring unit acquires the object information included in each image data for a location at which a number of items of image data associated with the position information within the predetermined range from the location among a plurality of locations whose positions can be specified is a predetermined number or more.

3. The information providing device according to claim 1, further comprising:
   a position information acquiring unit, within at least one of said at least one processor, that acquires position information indicating a current position of the user; and a location specifying unit, within at least one of said at least one processor, that specifies the location within the predetermined range from the current position of the user indicated by the acquired position information, from the plurality of locations whose positions can be specified, wherein the object information acquiring unit acquires the object information included in the image data associated with the position information within the predetermined range from each location per location specified by the location specifying unit.

4. The information providing device according to claim 2, further comprising:
a position information acquiring unit, within at least one of said at least one processor, that acquires position information indicating a current position of the user; and
a location specifying unit, within at least one of said at least one processor, that specifies the location within the predetermined range from the current position of the user indicated by the acquired position information, from the plurality of locations whose positions can be specified, wherein the object information acquiring unit acquires the object information included in the image data associated with the position information within the predetermined range from each location per location specified by the location specifying unit.

5. The information providing device according to claim 1, further comprising:
a position information acquiring unit, within at least one of said at least one processor, that acquires position information indicating a current position of a user,
wherein the deciding unit decides a coincidence between representative object information of a location within the predetermined range from the current position of the user indicated by the acquired position information of the representative object information stored in the location information memory, and the acquired user object information.

6. The information providing device according to claim 2, further comprising:
a position information acquiring unit, within at least one of said at least one processor, that acquires position information indicating a current position of a user,
wherein the deciding unit decides a coincidence between representative object information of a location within the predetermined range from the current position of the user indicated by the acquired position information of the representative object information stored in the location information memory, and the acquired user object information.

7. The information providing device according to claim 1, wherein the object information acquiring unit acquires the object information other than object information of a specific type from the image data.

8. The information providing device according to claim 2, wherein the object information acquiring unit acquires the object information other than object information of a specific type from the image data.

9. The information providing device according to claim 1, wherein the notifying unit removes the location information of the location matching the position information of the image data associated with the user identification information of the user, from the location information which is a notification target for the user.

10. The information providing device according to claim 2, wherein the notifying unit removes the location information of the location matching the position information of the image data associated with the user identification information of the user, from the location information which is a notification target for the user.

11. The information providing device according to claim 1, wherein the notifying unit removes the location information of the location matching the position information of the image data including the user object information associated with the user identification information of the user, from the location information which is a notification target for the user.

12. The information providing device according to claim 2, wherein the notifying unit removes the location information of the location matching the position information of the image data including the user object information associated with the user identification information of the user, from the location information which is a notification target for the user.

13. The information providing device according to claim 1, wherein the user object information acquiring unit acquires the user object information of the user from the image data stored in association with the user identification information of the user.

14. The information providing device according to claim 2, wherein the user object information acquiring unit acquires the user object information of the user from the image data stored in association with the user identification information of the user.

15. The information providing device according to claim 1, wherein the user object information acquiring unit acquires object information other than object information of a specific type from the image data as the user object information.

16. The information providing device according to claim 2, wherein the user object information acquiring unit acquires object information other than object information of a specific type from the image data as the user object information.

17. An information providing method executed by a computer, including at least one processor, comprising:
referring, using at least one of said at least one processor, to image data and position information in an image data memory unit that stores the image data associated with user identification information for identifying a user, and the position information of the image data, and acquiring object information included in the image data associated with position information within a predetermined range from each location per location whose position can be specified;
determining, using at least one of said at least one processor, per location, the object information satisfying a predetermined condition as representative object information of the location based on the object information acquired per location;
acquiring, using at least one of said at least one processor, from a picture of the image data stored in association with the user identification information of the user, the object information represented by the picture, as user object information of the user;
deciding, using at least one of said at least one processor, a coincidence between the acquired user object information and the determined representative object information of the location;
identifying, using at least one of said at least one, locations, within the predetermined range, based on a degree of concentration of shooting spots; and
notifying, using at least one of said at least one processor, location information related to the location stored in a location information memory unit in association with the representative object information, to the user identified from the user identification information based on a result of the identification and a decision result of the coincidence.

\* \* \* \* \*